United States Patent [19]

Olney

[11] Patent Number: 4,919,693
[45] Date of Patent: Apr. 24, 1990

[54] ELECTROSTATIC AIR CLEANER

[76] Inventor: Richard A. Olney, P.O. Box 534, O'Neill, Nebr. 68763

[21] Appl. No.: 330,066

[22] Filed: Mar. 29, 1989

[51] Int. Cl.⁵ .................................................. B03C 3/00
[52] U.S. Cl. ........................................ 55/124; 55/138; 55/139; 98/2.11
[58] Field of Search ................. 55/124, 126, 316, 140, 55/143, 145, 138, 139, 150; 98/2.11

[56] References Cited

U.S. PATENT DOCUMENTS

| | | | |
|---|---|---|---|
| 1,801,506 | 4/1931 | Jenks | 55/316 |
| 2,587,173 | 2/1952 | Landgraf | 55/101 |
| 3,311,108 | 3/1967 | Critofv et al. | 128/190 |
| 3,421,290 | 1/1969 | Cheney et al. | 55/101 |
| 3,531,150 | 9/1970 | Jahnke | 296/1 |
| 3,583,754 | 6/1971 | Graf Von Berckheim | 296/1 |
| 3,657,992 | 4/1972 | Minnick | 55/316 |
| 3,747,301 | 7/1973 | Glover et al. | 55/140 |
| 4,261,712 | 4/1981 | Kinkade | 55/126 |
| 4,658,707 | 4/1987 | Hawkins et al. | 98/2.11 |
| 4,722,747 | 2/1988 | Ambruster | 55/385.3 |

Primary Examiner—Bernard Nozick
Attorney, Agent, or Firm—Jerry T. Kearns

[57] ABSTRACT

An electrostatic air cleaner for use in motor vehicles has a housing enclosing a fan, a charcoal filter and an electrostatic air cleaning element. The electrostatic element and the filter are removable through a top cover for cleaning purposes. A telescoping rod extends through a ring on a top surface of the housing cover and includes frictional pads engaged with opposite side walls within a vehicle interior for securing the electrostatic air cleaner adjacent an interior vehicle ceiling. The electrostatic cleaner may be powered by an adaptor connected to a cord and engaged with a vehicle cigarette lighter.

10 Claims, 3 Drawing Sheets

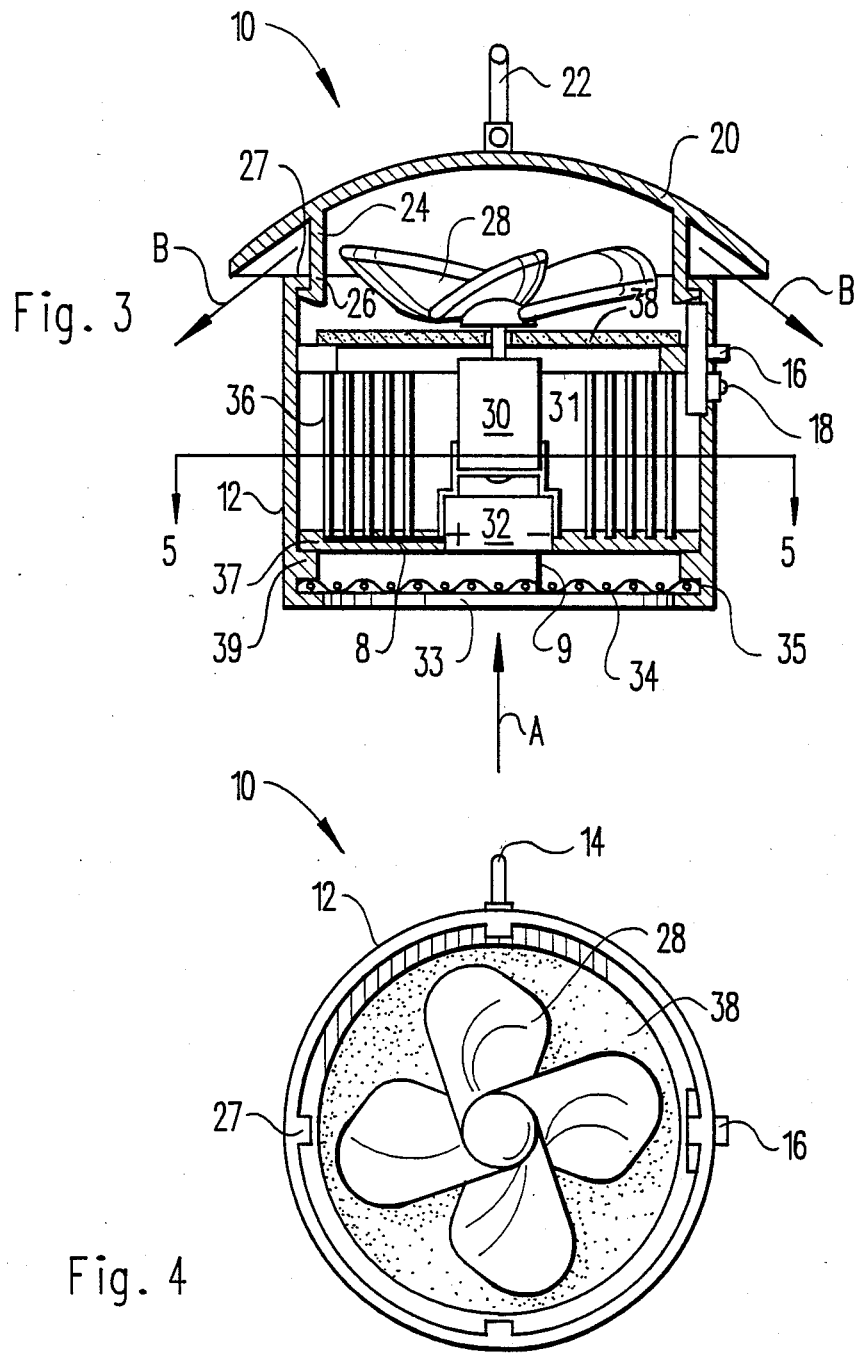

ELECTROSTATIC AIR CLEANER

BACKGROUND OF THE INVENTION

1. Field of the Invention

The present invention relates to air cleaners, and more particularly pertains to a new and improved electrostatic air cleaner for use in motor vehicles. The interior air within vehicles is frequently contaminated with pollen and dust particles and particularly with smoke from smoking vehicle occupants. Modern awareness of the harmful effects of smoking have created an increased demand for air cleaning devices and have resulted in controversy and conflict between smoking and non-smoking vehicle occupants. In order to overcome this problem and to provide relief for allergy sufferers, the present invention provides a portable electrostatic air purifying device for mounting within a motor vehicle interior.

2. Description of the Prior Art

Various types of air cleaning devices are known in the prior art. A typical example of an electrostatic air cleaner is to be found in U.S. Pat. No. 2,587,173, which issued to G. Landgraf on Feb. 26, 1952. This patent discloses an electrode for electrostatic air filters. U.S. Pat. No. 3,311,108, which issued to C. Cristofv et al on Mar. 28, 1967, discloses an electrostatic device for producing and controlling ionized fields within a room interior. U.S. Pat. No. 3,421,290, which issued to W. Cheney et al on Jan. 14, 1969, discloses an indoor smoke removal system for use in building interiors which includes an electronic air cleaner connected by a plurality of ducts to a room interior. U.S. Pat. No. 3,531,150, which issued to H. Jahnke on Sept. 29, 1970, discloses a motor vehicle provided with an electrostatic unit for conditioning the vehicle interior air. A source of direct current supplies voltage to vehicle interior electrodes to produce an allegedly beneficial electrostatic field. U.S. Pat. No. 3,583,754, which issued to C. Graf von Berckheim on June 8, 1971, discloses an arrangement for producing an electrostatic field within the interior of a motor vehicle.

While the above mentioned devices are directed to air cleaners, none of these devices disclose an electrostatic air cleaner having an interior fan and including an arrangement for mounting adjacent the interior ceiling portion of a vehicle. Additional features of the present invention, not contemplated by the aforesaid prior art devices, include the provision of removable electrostatic element and fan, the use of a telescopic mounting rod for engagement with opposed interior vehicle side walls and the provision of a portable cleaning element adapted for connection to a vehicle cigarette lighter. Inasmuch as the art is relatively crowded with respect to these various types of air cleaners, it can be appreciated that there is a continuing need for and interest in improvements to such air cleaners, and in this respect, the present invention addresses this need and interest.

SUMMARY OF THE INVENTION

In view of the foregoing disadvantages inherent in the known types of air cleaners now present in the prior art, the present invention provides an improved electrostatic air cleaner. As such, the general purpose of the present invention, which will be described subsequently in greater detail, is to provide a new and improved electrostatic air cleaner which has all the advantages of the prior art air cleaners and none of the disadvantages.

To attain this, a representative embodiment of the concepts of the present invention is illustrated in the drawings and makes use of an electrostatic air cleaner for use in motor vehicles having a housing enclosing a fan, a charcoal filter and an electrostatic air cleaning element. The electrostatic element in the filter are removable through a top cover for cleaning purposes. A telescoping rod extends through a ring on a top surface of the housing cover and includes frictional pads engaged with opposite side walls within a vehicle interior for securing the electrostatic air cleaner adjacent an interior vehicle ceiling. The electrostatic cleaner may be powered by an adaptor connected to a cord and engaged with a vehicle cigarette lighter.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved electrostatic air cleaner which has all the advantages of the prior art air cleaners and none of the disadvantages.

It is another object of the present invention to provide a new and improved electrostatic air cleaner which may be easily and efficiently manufactured and marketed.

It is a further object of the present invention to provide a new and improved electrostatic air cleaner which is of a durable and reliable construction.

An even further object of the present invention is to provide a new and improved electrostatic air cleaner which is susceptible of a low cost of manufacture with regard to both materials and labor, and which accordingly is then susceptible of low prices of sale to the consuming public, thereby making such air cleaners economically available to the buying public.

Still yet another object of the present invention is to provide a new and improved electrostatic air cleaner which provides in the apparatuses and methods of the prior art some of the advantages thereof, while simultaneously overcoming some of the disadvantages normally associated therewith.

Still another object of the present invention is to provide a new and improved electrostatic air cleaner for purifying the air within the interior of a motor vehicle.

Yet another object of the present invention is to provide a new and improved electrostatic air cleaner which is easily portable and may be disassembled for cleaning.

Even still another object of the present invention is to provide a new and improved electrostatic air cleaner having a novel mounting arrangement for securement adjacent the interior ceiling portion within a motor vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a longitudinal cross sectional view, taken along line 3—3 of FIG. 2 and illustrating the interior components of the electrostatic cleaning device.

FIG. 4 is a top view illustrating the electrostatic cleaning device with the cover removed.

DESCRIPTION OF THE PREFERRED EMBODIMENT

Figure 1:
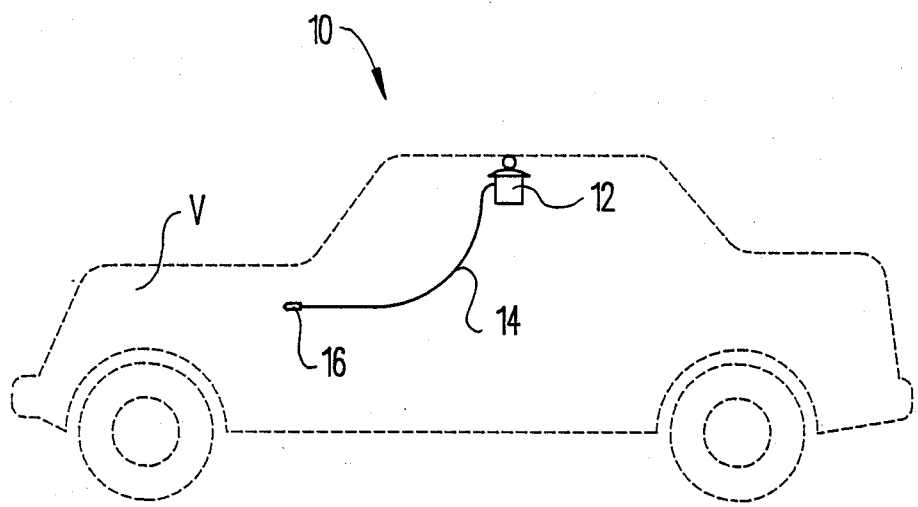
FIG. 1 is a diagrammatic side view illustrating the mounting of the electrostatic air cleaning device of the present invention in a vehicle interior.
Figure 2:
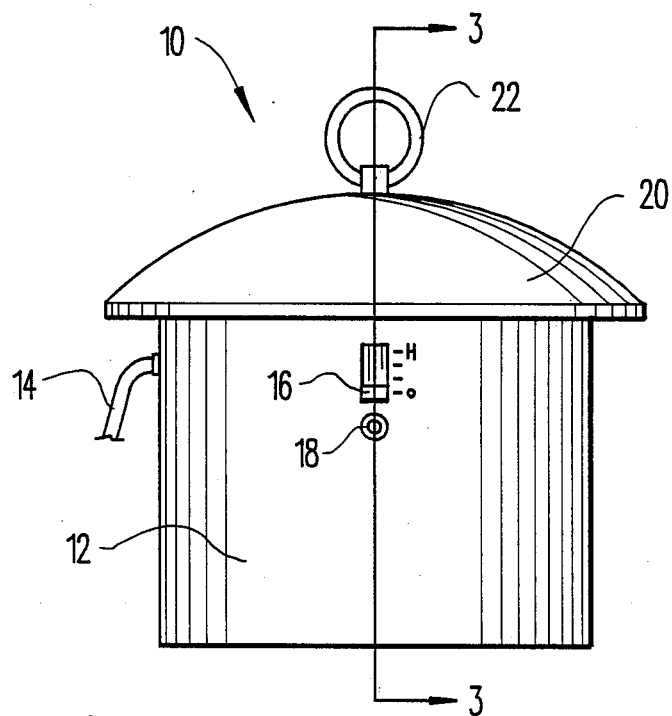
FIG. 2 is a side view illustrating the electrostatic cleaning device of the present invention.

With reference now to the drawings, and in particular to FIG. 1 thereof, a new and improved electrostatic air cleaner embodying the principles and concepts of the present invention and generally designated by the reference numeral 10 will be described.

More specifically, it will be noted that the first embodiment 10 of the invention includes a hollow cylindrical housing 12 adapted for mounting adjacent the interior ceiling portion of a vehicle V. A power cord 14 is connected to an adaptor 16 operatively engaged within a cigarette lighter of the vehicle V.

The cylindrical housing 12 has a removable top cover 20 to provide convenient access to the interior components of the cleaning device 10 for cleaning purposes. A ring 22 is centrally secured on a top exterior surface of the cover 20 to facilitate mounting of the housing 12 adjacent the interior ceiling portion of a vehicle. A fan within the housing 12 is controlled by a switch 16 which energizes as well as selects the operating speed of the interior fan. An operating light 18 may be provided to indicate power supply to an interior electrostatic cleaning element.

FIG. 3 illustrates the components of the electrostatic cleaning device 10. An air inlet opening 33 is formed through a bottom end surface of the housing 12. A filter screen 34 overlies the inlet opening 33 and has a circular peripheral edge removably retained in an annular undercut groove 35 formed in the interior cylindrical side wall of the housing 12. An electrostatic element 36 is located within the housing 12 and includes a pair of perpendicular support struts, one of which is illustrated in FIG. 3 at 37. End portions of the struts 37 are supported by a radially inwardly extending annular ledge 39 formed within the housing 12. A support bracket 31 is secured at a central intersection of the support struts 37 and supports an electric fan motor 30 and a transformer 32 for providing a high voltage DC current to the electrostatic element 36 via conductor 8. The electrostatic element 36 utilizes cylindrical positively charged plates separated by negatively charged wires. Alternatively, the inlet screen 34 may be connected to the transformer by electrical lead 9 and serve as the negative electrode for the electrostatic element 36. A porous foam filter 38 is impregnated with activated charcoal for removing chemical vapor and odors from the vehicle interior. A blade 28 is driven by the fan motor 30 to induct air through the inlet opening 33 as indicated by arrow A. A plurality of inwardly extending circumferentially spaced projections 27 are disposed adjacent an upper end of the housing 12. A removable arcuate cover 20 has a plurality of cooperating downwardly extending latch members 26 for engagement with the projections 27. An air outlet opening is formed adjacent the upper end of the housing 12, between the latch members 24 for exhausting purified air to the vehicle interior as indicated by arrows B.

FIG. 4 is a top view illustrating the air cleaning device with the cover removed.

Figure 5:
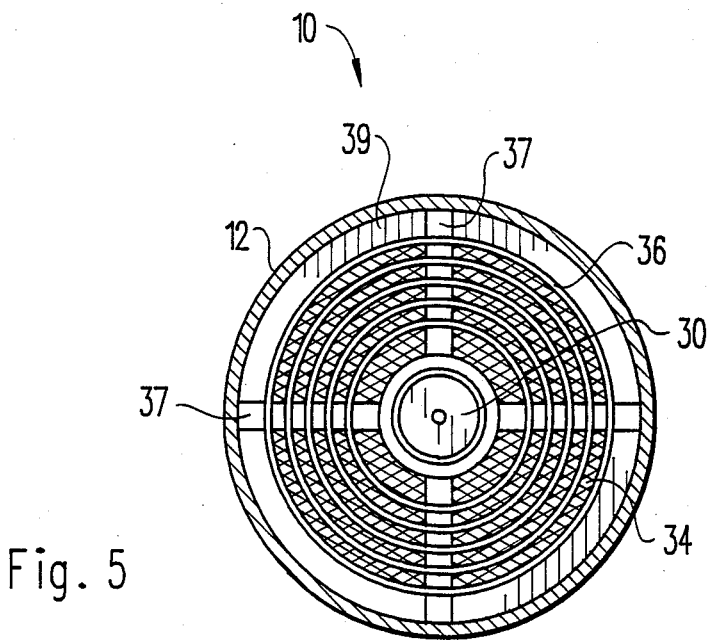
FIG. 5 is a transverse cross sectional view, taken along line 5—5 of FIG. 3.

FIG. 5 is a cross sectional view, taken along line 5—5 of FIG. 3 which illustrates the intersecting perpendicular support struts 37 in abutment with the annular support ledge 39.

Figure 6:
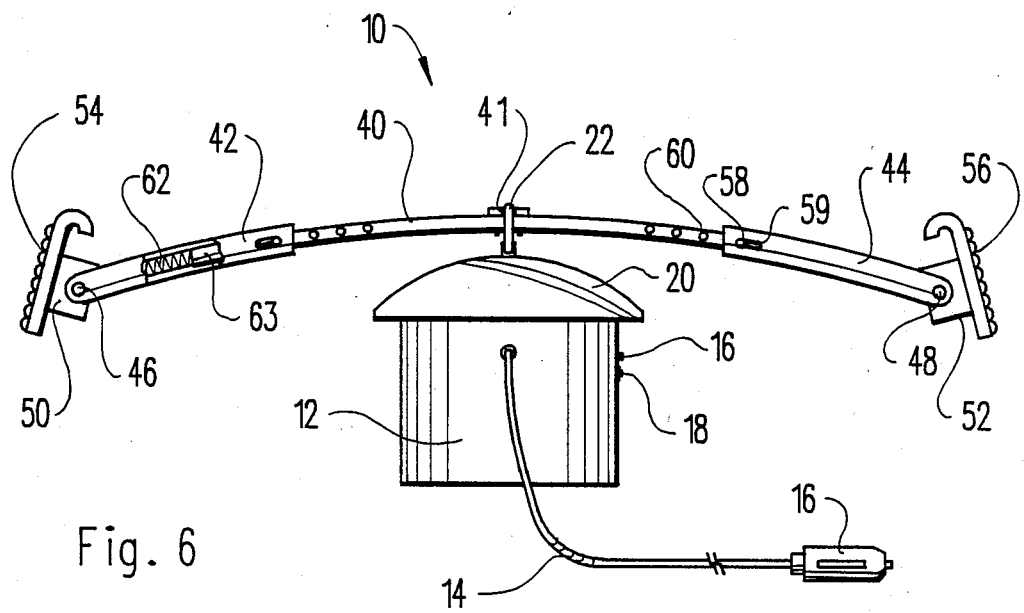
FIG. 6 is a side view illustrating the mounting arrangement for securing the electrostatic cleaning device within a vehicle interior.

FIG. 6 is a side view illustrating the mounting arrangement for supporting the housing 12 adjacent an interior ceiling portion within a vehicle. A rod 40 is received through the ring 22 which is centrally secured thereon by a bracket 41. The rod 40 has opposite end portions received in respective telescoping sleeves 42 and 44. Each of the sleeve portions may include a leaf spring 59 having an inwardly biased detent 58 for engagement with one of a plurality of spaced recesses 60 formed on the rod 40. This allows the sleeves 42 and 44 to be retained in a selected adjusted position. Additionally or alternatively, each of the sleeves 42 and 44 may include an internal spring 62 in abutment with an interior end portion 63 of the rod 40 to bias the sleeves 42 and 44 outwardly. Frictional mounting pads 50 and 52 are pivotally secured at outer ends 46 and 48 of the sleeves 42 and 44. Roughened or enhanced frictional engagement surfaces 54 and 56 are provided on the pads 50 and 52 for engagement with opposed interior side walls within a vehicle. This allows the housing 12 to be easily installed adjacent the interior ceiling portion within a vehicle, which is the ideal location because of the fact that cigarette smoke and the breath of vehicle occupants is generally at a higher temperature than the rest of the air in the vehicle and thus would rise to be purified by the cleaning unit. Alternatively, the mounting arrangements may be omitted and the device may be located on the dashboard or console within the vehicle.

As may now be understood, the present invention provides an easily portable electrostatic air cleaning unit which is readily mounted within any vehicle to provide relief from dust, pollen and cigarette smoke to sensitive vehicle occupants.

With respect to the above description then, it is to be realized that the optimum dimensional relationships for the parts of the invention, to include variations in size, materials, shape, form, function ad manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. An electrostatic air cleaner for use in vehicles, comprising:
    a hollow housing defining an interior air flow path;
    an air inlet opening in a bottom of said housing;
    an electrostatic precipitator in said housing;
    a charcoal filter in said housing;
    an air outlet opening adjacent a top portion of said housing, on a downstream side of said charcoal filter for returning purified air to said vehicle interior;
    a fan in said housing for inducting air from a vehicle interior through said air inlet opening, said electrostatic precipitator, said charcoal filter, and exhausting air through said air outlet opening; and
    a telescoping rod connected to said housing and having frictional pads for engagement with opposite side walls of a vehicle for securing said housing adjacent an interior ceiling of a vehicle.

2. The electrostatic air cleaner of claim 1, further comprising detent means for securing said rod in adjusted position.

3. The electrostatic air cleaner of claim 1, further comprising spring means biasing said rod to an extended position.

4. The electrostatic air cleaner of claim 1, further comprising a removable cover on a top portion of said housing allowing access to said filter and electrostatic precipitator for cleaning; and
    means for removably securing said cover on said housing.

5. The electrostatic air cleaner of claim 4, further comprising means for removably securing said electrostatic precipitator and said filter in said housing, such that said electrostatic precipitator and said filter are removable from said housing for cleaning.

6. The electrostatic air cleaner of claim 1, further comprising a transformer in said housing;
    means for connecting said transformer to an external power source; and
    means connecting said transformer to said electrostatic precipitator for providing electrical power to said electrostatic precipitator.

7. The electrostatic air cleaner of claim 6, further comprising means for connecting said transformer and said fan to a vehicle cigarette lighter.

8. An electrostatic air cleaner for use in vehicles, comprising:
    a hollow cylindrical housing;
    an air inlet opening formed through a bottom end of said housing;
    a filter screen over said air inlet opening, said screen having peripheral edges removably retained in an annular undercut groove within said housing;
    an electrostatic precipitator in said housing including a pair of perpendicular support struts having end portions in abutment with an annular ledge in said housing;
    a support bracket secured at an inner section of said support strut;
    an electric fan mounted on said support bracket for inducting air from a vehicle interior through said air inlet opening;
    a transformer secured to said support bracket for supplying a high voltage DC current to said electrostatic precipitator;
    a charcoal filter on a down stream side of said electrostatic precipitator;
    a plurality of inwardly extending circumferentially spaced projections adjacent an upper end of said housing;
    a removable arcuate cover having a plurality of downwardly extending resilient latch members for engagement with said spaced projections;
    an air outlet opening formed adjacent an upper end of said housing for exhausting purified air to a vehicle interior;
    a cigarette lighter adaptor, for engagement with a vehicle cigarette lighter, connected to said housing by a cord for powering said fan and electrostatic precipitator;
    said electrostatic precipitator and said filter removable from said housing for cleaning;
    a ring centrally provided on an exterior top surface of said housing cover;
    a telescoping rod extending through said ring; and
    friction pads pivotally secured on opposite ends of said telescoping rod for engagement with opposed side walls of a vehicle interior.

9. The electrostatic air cleaner of claim 8, further comprising detent means for securing said rod in adjusted position.

10. The electrostatic air cleaner of claim 9, further comprising spring means biasing said rod to an extended position.

* * * * *